United States Patent
Huh et al.

(10) Patent No.: US 11,721,004 B2
(45) Date of Patent: Aug. 8, 2023

(54) THERMAL CAMERA AND METHOD OF PROCESSING THERMAL IMAGE THEREOF

(71) Applicant: HANWHA TECHWIN CO., LTD., Seongnam-si (KR)

(72) Inventors: Jin Wook Huh, Seongnam-si (KR); Ki Rim Lee, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 102 days.

(21) Appl. No.: 17/495,975

(22) Filed: Oct. 7, 2021

(65) Prior Publication Data

US 2022/0358628 A1 Nov. 10, 2022

(51) Int. Cl.
  *G06T 5/40* (2006.01)
  *H04N 23/741* (2023.01)
  *G06T 5/00* (2006.01)

(52) U.S. Cl.
  CPC ............... *G06T 5/40* (2013.01); *G06T 5/009* (2013.01); *H04N 23/741* (2023.01); *G06T 2207/10048* (2013.01); *G06T 2207/30232* (2013.01)

(58) Field of Classification Search
  CPC . G06T 5/40; G06T 5/009; G06T 2207/10048; G06T 2207/30232; H04N 23/741
  See application file for complete search history.

(56) References Cited

U.S. PATENT DOCUMENTS

| | | | |
|---|---|---|---|
| 11,049,226 B1* | 6/2021 | Robison | G06T 3/4076 |
| 2014/0254924 A1* | 9/2014 | Lin | G06T 7/90 |
| | | | 382/164 |
| 2016/0042500 A1* | 2/2016 | Engberg | H04N 25/68 |
| | | | 348/252 |

FOREIGN PATENT DOCUMENTS

| | | |
|---|---|---|
| KR | 10-1849740 B1 | 3/2017 |
| KR | 10-2019-0081760 A | 7/2019 |
| KR | 10-2020-0087440 A | 7/2020 |

* cited by examiner

*Primary Examiner* — Jae N Noh
(74) *Attorney, Agent, or Firm* — McLean IP Global; Jason Y. Pahng (57) ABSTRACT

A thermal image processing method includes determining a blending ratio of a first equalization algorithm to a second equalization algorithm that are different from each other, based on a result of analyzing an original histogram of an original thermal image; generating a first corrected thermal image obtained by applying the first equalization algorithm and the second equalization algorithm to the original thermal image according to the blending ratio; adjusting the blending ratio by comparing a corrected histogram of the first corrected thermal image with the original histogram; and generating a second corrected thermal image obtained by applying the first equalization algorithm and the second equalization algorithm to the original thermal image according to the adjusted blending ratio.

17 Claims, 10 Drawing Sheets

THERMAL CAMERA AND METHOD OF PROCESSING THERMAL IMAGE THEREOF

CROSS-REFERENCE TO RELATED APPLICATION

This application is based on and claims priority under 35 U.S.C. § 119 to Korean Patent Application No. 10-2021-0060340, filed on May 10, 2021, in the Korean Intellectual Property Office, the disclosure of which is incorporated by reference herein in its entirety.

BACKGROUND

1. Field

One or more embodiments relate to a thermal camera and a method of processing a thermal image thereof.

2. Description of the Related Art

Recent surveillance systems perform surveillance by using a thermal camera or using both a general camera and a thermal camera.

The surveillance environment or the purpose of surveillance during use of a thermal camera requires thermal image data to be processed in a form usable by a user.

SUMMARY

One or more embodiments include a thermal image with minimized loss of detail elements and an optimally improved contrast by adjusting histogram equalization methods for processing thermal image data and a ratio of the histogram equalization methods, according to an installed environment of a thermal camera.

Additional aspects will be set forth in part in the description which follows and, in part, will be apparent from the description, or may be learned by practice of the presented embodiments of the disclosure.

According to one or more embodiments, a thermal image processing method includes: determining a blending ratio of a first equalization algorithm to a second equalization algorithm that are different from each other, based on a result of analyzing an original histogram of an original thermal image; generating a first corrected thermal image obtained by applying the first equalization algorithm and the second equalization algorithm to the original thermal image according to the blending ratio; adjusting the blending ratio by comparing a corrected histogram of the first corrected thermal image with the original histogram; and generating a second corrected thermal image obtained by applying the first equalization algorithm and the second equalization algorithm to the original thermal image according to the adjusted blending ratio.

The determination of the blending ratio may include: classifying the original histogram into a second sub-histogram corresponding to a first region having a large number of detail elements in the original thermal image and a first sub-histogram corresponding to a second region other than the first region; and determining a ratio of the first sub-histogram to the second sub-histogram as a blending ratio of the first equalization algorithm to the second equalization algorithm.

The classification of the original histogram may include, when a distribution gap, which is a difference between a minimum index and a maximum index on a horizontal axis of a sub-histogram, is less than a threshold, classifying the sub-histogram into the first sub-histogram, and when a distribution gap is equal to or greater than the threshold, classifying the sub-histogram into the second sub-histogram.

The ratio of the first sub-histogram to the second sub-histogram may be a ratio of a sum of occurrence frequencies of the first sub-histogram to a sum of occurrence frequencies of the second sub-histogram.

The adjusting of the blending ratio may include: detecting the second characteristic data from the corrected histogram by using a corresponding first sub-histogram corresponding to the first sub-histogram and by using a corresponding second sub-histogram corresponding to the second sub-histogram; and adjusting the blending ratio by comparing the second characteristic data with first characteristic data of the first sub-histogram and the second sub-histogram.

The comparison of the first characteristic data with the second characteristic data may include comparison of a distribution gap of the first sub-histogram with a distribution gap of the corresponding first sub-histogram and comparison of a distribution gap of the second sub-histogram with a distribution gap of the corresponding second sub-histogram.

The thermal image processing method may further include: detecting skewness and clip of the corresponding first sub-histogram and the corresponding second sub-histogram from the corrected histogram; and adjusting a gain of the corresponding first sub-histogram and the corresponding second sub-histogram according to the skewness and clip.

The first equalization algorithm may include a method of equalizing a histogram with respect to a region having a high occurrence frequency in the histogram, and the second equalization algorithm may include a method of equalizing the histogram with respect to a region having a large number of detail elements.

According to one or more embodiments, a thermal camera includes: a detector; and a processor configured to generate a thermal image by using a pixel brightness value input from the detector, wherein the processor is further configured to determine a blending ratio of a first equalization algorithm to a second equalization algorithm that are different from each other, based on a result of analyzing an original histogram of an original thermal image, and generate a first corrected thermal image obtained by applying the first equalization algorithm and the second equalization algorithm to the original thermal image according to the blending ratio, and adjust the blending ratio by comparing a corrected histogram of the first corrected thermal image with the original histogram, and generate a second corrected thermal image obtained by applying the first equalization algorithm and the second equalization algorithm to the original thermal image according to the adjusted blending ratio.

The processor may be further configured to classify the original histogram into a second sub-histogram corresponding to a first region having a large number of detail elements and a first sub-histogram corresponding to a second region other than the first region, and determine a ratio of the first sub-histogram to the second sub-histogram as a blending ratio of the first equalization algorithm and the second equalization algorithm.

The processor may be further configured to, when a distribution gap, which is a difference between a minimum index and a maximum index on a horizontal axis of a sub-histogram, is less than a threshold, classify the sub-histogram into the first sub-histogram, and when a distribution gap is equal to or greater than the threshold, to classify the sub-histogram into the second sub-histogram.

The ratio of the first sub-histogram to the second sub-histogram may be a ratio of a sum of occurrence frequencies of the first sub-histogram to a sum of occurrence frequencies of the second sub-histogram.

The processor may be further configured to detect second characteristic data from the corrected histogram by using a corresponding first sub-histogram corresponding to the first sub-histogram and by using a corresponding second sub-histogram corresponding to the second sub-histogram and adjust the blending ratio by comparing the second characteristic data with first characteristic data of the first sub-histogram and the second sub-histogram.

The comparison of the first characteristic data with the second characteristic data may include comparing a distribution gap of the first sub-histogram with a distribution gap of the corresponding first sub-histogram and comparing a distribution gap of the second sub-histogram with a distribution gap of the corresponding second sub-histogram.

The processor may be further configured to detect, from the corrected histogram, skewness and clip of the corresponding first sub-histogram and the corresponding second sub-histogram, and adjust a gain of the corresponding first sub-histogram and the corresponding second sub-histogram according to the skewness and clip.

The first equalization algorithm may include a method of equalizing a histogram with respect to a region having a high occurrence frequency in the histogram, and the second equalization algorithm may include a method of equalizing the histogram with respect to a region having a large number of detail elements.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following description exemplifies only the principles of the present disclosure. Even if they are not described or illustrated clearly in the present specification, those of ordinary skill in the art can embody the principles of the present disclosure and invent various apparatuses within the concept and scope of the present disclosure. The use of the conditional terms and embodiments presented in the present specification are intended only to make the concept of the present disclosure understood, and they are not limited to the embodiments and conditions mentioned in the specification. In addition, all the detailed description on the principles, viewpoints and embodiments and particular embodiments of the present disclosure should be understood to include structural and functional equivalents to them. The equivalents include not only currently known equivalents but also those to be developed in future, that is, all devices invented to perform the same function, regardless of their structures.

Therefore, functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, a single shared processor, or a plurality of individual processors, part of which can be shared. The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

The foregoing objects, features, and advantages will be more apparent from the following detailed description made with reference to the accompanying drawings. In the description of the present disclosure, the detailed description of known techniques which might unnecessarily obscure the subject matter of the present disclosure will be omitted or made in brief.

When a part "includes" a component, it means that the part does not include components other than the mentioned component but may include other components provided that there is no special indication to the contrary.

Hereinafter, an exemplary embodiment of the present disclosure will be described in detail with reference to the accompanying drawings.

Also, in the description and the drawings of the present disclosure, components having substantially identical structures will be labeled with identical reference numerals to omit repeated description.

Figure 1:
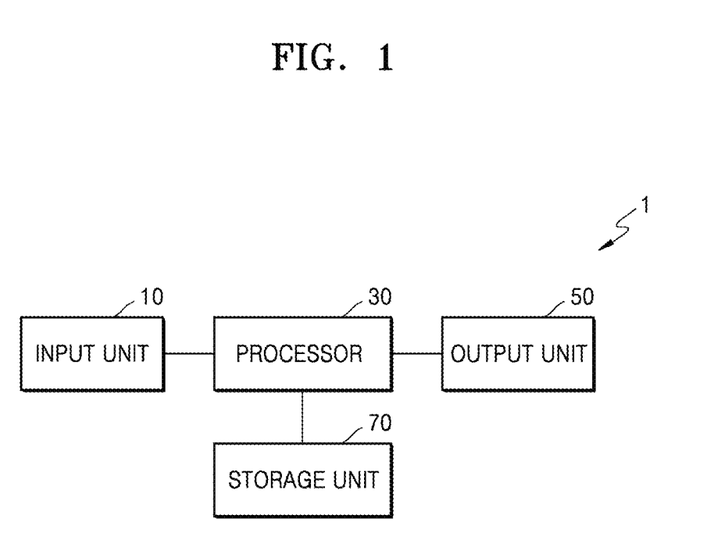
FIG. 1 is a schematic diagram illustrating a thermal camera according to an embodiment.

FIG. 1 is a schematic diagram illustrating a thermal camera according to an embodiment.

A thermal camera 1 detects radiant energy (thermal energy) emitted from an object and measures an intensity of the thermal energy to generate thermal images of different colors according to the intensity. In a thermal image, a surface of an object may be expressed by mapping different colors to portions of the surface of the object according to a degree of temperature. The thermal camera 1 may be arranged at a fixed location of a particular place and may have a pan/tilt/zoom function. The thermal camera 1 may capture an image of an allocated surveillance area to obtain a thermal image.

Referring to FIG. 1, the thermal camera 1 may include an input unit 10, a processor 30, an output unit 50, and a storage unit 70.

The input unit 10 may include a lens transmitting through or focusing energy in an effective wavelength band (e.g., an infrared wavelength band), a thermal image sensor (detector) detecting energy of an effective wavelength band, and an analog-digital converter (ADC) digitizing an analog signal output from the thermal image sensor. The input unit 10 may further include a certain filter. The thermal image sensor may correspond to an image sensor of a color image camera, for example, a charge-coupled device (CCD) or a complementary metal-oxide semiconductor (CMOS). The thermal image sensor may include a focal plane array (FPA) including pixels of a micrometer size and a material capable of detecting an infrared wavelength. Hereinafter, a value indicating an amount of infrared energy output by each pixel will be referred to as a 'pixel brightness value.' The ADC may convert a pixel brightness value, which is an analog signal output by the thermal image sensor, into a digital signal.

The processor 30 may generate a thermal image by using a pixel brightness value output from the input unit 10. The processor 30 may perform various data processing for improving image quality, on thermal image data. The processor 30 may improve an image quality of a thermal image by performing histogram equalization and/or histogram stretching on thermal image data.

The processor 30 may be implemented using various numbers of hardware or/and software components performing certain functions. For example, the processor 30 may refer to a data processing device that is embedded in a hardware component and has a physically structured circuit to perform a function expressed as code or a command included in a program. Examples of the data processing device embedded in a hardware component may encompass a microprocessor, a central processing unit (CPU), a processor core, a multiprocessor, an application-specific integrated circuit (ASIC), a field programmable gate array (FPGA), an image signal processor (ISP), and the like, but the present disclosure is not limited thereto.

The output unit 50 may include a display displaying data processing results obtained by the processor 30. The display may include, for example, a liquid crystal display (LCD) panel, an organic light-emitting display (OLED) panel, or an electrophoretic display (EPD) panel.

The storage unit 70 may store programs for processing and controlling the processor 30, and store input/output data of the processor 30 (for example, thermal images). The storage unit 70 may include random access memory (RAM), read-only memory (ROM), and a combination thereof. The storage unit 70 may include a large-capacity storage device including a hard disk drive, an optical disk drive, a solid-state drive (SSD). The storage unit 70 may be embedded in the thermal camera 1 or mountably included therein.

Figure 2:
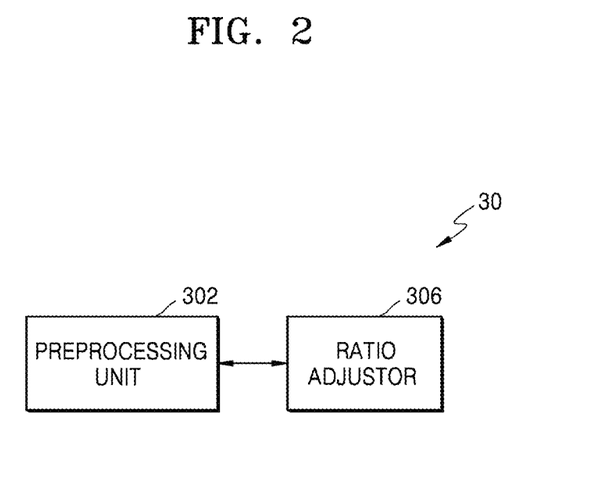
FIG. 2 is a schematic structural diagram of a processor according to an embodiment.

FIG. 2 is a schematic structural diagram of a processor according to an embodiment.

Referring to FIG. 2, the processor 30 may include a preprocessing unit 302 and a ratio adjustor 306.

The preprocessing unit 302 may improve contrast by adjusting a distribution of pixel brightness values of an original thermal image by performing histogram equalization and/or histogram stretching on original thermal image data. A histogram may be defined by a graph showing a distribution of pixel brightness values of a thermal image, where the horizontal axis denotes a pixel brightness value and the vertical axis denotes a frequency of occurrence of each pixel brightness value (or number of pixels).

The preprocessing unit 302 may generate a corrected thermal image having an improved contrast by preprocessing an original thermal image by using a plurality of histogram equalization algorithms. The preprocessing unit 302 may generate a corrected thermal image by applying a plurality of, different histogram equalization algorithms to an original thermal image, according to a blending ratio control signal received from the ratio adjustor 306.

The preprocessing unit 302 may generate a corrected thermal image obtained by correcting an original thermal image by adjusting, according to a blending ratio, a ratio (degree) of applying a first equalization algorithm and a second equalization algorithm that are different from each other.

The first equalization algorithm may include a method of equalizing a histogram with respect to a region of a histogram, the region having a high occurrence frequency of pixel brightness values. The first equalization algorithm may equalize a histogram by using a cumulative distribution function. Also, the first equalization algorithm may equalize a histogram by setting an upper limit to an occurrence frequency of pixel brightness values globally or locally. According to an embodiment, the first equalization algorithm may include a contrast limited histogram equalization algorithm. The contrast limited histogram equalization refers to equalizing a histogram by redistributing a pixel brightness value equal to or greater than a certain value by limiting a size of the vertical axis of the histogram to the certain value. According to an embodiment of the present disclosure, the first equalization algorithm may use well-known contrast limited histogram equalization, contrast limited adaptive histogram equalization, or the like.

The second equalization algorithm may include a method of equalizing a histogram by considering a detail element. The second equalization algorithm may include a histogram equalization method in which loss of detail elements of an image is minimized. The second equalization algorithm may detect, as a detail region which has numerous detail elements, that is, a region requiring detailed information, such as a region of interest, a movement region, a high-frequency region, or the like, by using edge data of an image, and perform histogram equalization with respect to a histogram of the detail region.

In an embodiment of the present disclosure, an equalization algorithm based on a detail element of an image is not limited, and a known histogram equalization algorithm having relatively small loss of detail elements of an image compared to the first equalization algorithm may be used. For example, among a plurality of known, different histogram equalization algorithms, histogram equalization, which has a relatively simple operation method in which detail elements are not considered, may be used as a first equalization algorithm, and histogram equalization with relatively small loss of detail elements compared to the first equalization algorithm may be used as a second equalization algorithm.

The ratio adjustor 306 may analyze an original histogram received from an original thermal image to first determine a ratio of applying each of the first equalization algorithm and the second equalization algorithm, that is, a blending ratio.

The ratio adjustor 306 may classify an original histogram into a sub-histogram (second sub-histogram) corresponding to a detail region (first region) and a sub-histogram (first sub-histogram) corresponding to other regions (second region).

The ratio adjustor 306 may classify an original histogram into sub-histograms based on an index of the horizontal axis including no or minimum occurrence frequency of pixel brightness values in the original histogram. Alternatively, the ratio adjustor 306 may classify an original histogram into sub-histograms based on an index of the horizontal axis with a relatively high occurrence frequency of pixel brightness values. The ratio adjustor 306 may detect characteristic data from each sub-histogram. The characteristic data may include a minimum index and a maximum index in the horizontal axis of a sub-histogram and a difference between the minimum index and the maximum index (hereinafter, a 'distribution gap').

When a distribution gap of a sub-histogram is less than a threshold, the ratio adjustor 306 may classify the sub-histogram as a first sub-histogram, and when a distribution gap of a sub-histogram is equal to or greater than the threshold, the ratio adjustor 306 may classify the sub-histogram as a second sub-histogram. When a region has a distribution gap that is less than a threshold, the region may be determined to have a narrow temperature distribution and a relatively small number of detail elements, for example, the sky, the inside of a tunnel, or the surface of a wall. When a region has a distribution gap that is equal to or greater than a threshold, the region may be determined to have a relatively large number of detail elements and a broad temperature distribution.

The ratio adjustor 306 may determine a ratio of a first sub-histogram to a second sub-histogram as a first blending ratio of a first equalization algorithm to a second equalization algorithm. The ratio of the first sub-histogram to the second sub-histogram may be determined based on an amount of first sub-histograms and an amount of second sub-histograms. The ratio adjustor 306 may calculate a sum of occurrence frequencies of first sub-histograms, that is, a sum of the number of pixels having pixel brightness values of the first sub-histograms (a first pixel number) as the amount of the first sub-histograms. The ratio adjustor 306 may calculate a sum of occurrence frequencies of second sub-histograms, that is, a sum of the number of pixels having pixel brightness values of the second sub-histograms (a second pixel number) as the amount of the second sub-histograms.

The ratio adjustor 306 may determine a ratio of the first pixel number to the second pixel number as a first blending ratio of the first equalization algorithm to the second equalization algorithm. For example, when a ratio of the first pixel number to the second pixel number is m:n, the first blending ratio of the first equalization algorithm to the second equalization algorithm may be determined to be m:n.

The ratio adjustor 306 may output a control signal including the first blending ratio, to the preprocessing unit 302.

The preprocessing unit 302 may generate a first corrected thermal image by equalizing an original histogram by applying the first equalization algorithm and the second equalization algorithm based on the first blending ratio. According to an embodiment, the preprocessing unit 302 may generate the first corrected thermal image by calculating a weighted sum of a corrected thermal image to which the first equalization algorithm is applied and a corrected thermal image to which the second equalization algorithm is applied, by using a blending ratio as a weight.

The ratio adjustor 306 may adjust a blending ratio by comparing a corrected histogram with respect to the first corrected thermal image with the original histogram. As the first blending ratio is determined by classifying a sub-histogram with respect to a distribution gap of a sub-histogram, a sub-histogram of a first region having a relatively high occurrence frequency may be incorrectly classified as a first sub-histogram, and when equalization algorithms are blended according to a simple ratio based on amounts of histograms, a degree of improvement of image quality may not be clear. According to an embodiment of the present disclosure, by analyzing a corrected histogram with respect to the first corrected thermal image generated according to the first blending ratio, a corrected thermal image having improved image quality may be generated by adjusting the first blending ratio.

The ratio adjustor 306 may detect characteristic data from a corresponding sub-histogram corresponding to each sub-histogram of an original histogram, from a corrected histogram. The ratio adjustor 306 may detect a change between characteristic data of an original histogram and characteristic data of a corrected histogram. The ratio adjustor 306 may detect a change between characteristic data of a sub-histogram of an original histogram and characteristic data of a corresponding sub-histogram.

The ratio adjustor 306 may detect a change in characteristic data due to histogram equalization by comparing a distribution gap of a first sub-histogram in an original histogram with a distribution gap of a corresponding first sub-histogram in a corrected histogram to each other and comparing a distribution gap of a second sub-histogram in an original histogram with a distribution gap of a corresponding second sub-histogram in a corrected histogram to each other. The ratio adjustor 306 may detect a change in characteristic data based on an increase or decrease in a ratio of a distribution gap of a corresponding first sub-histogram and an increase or decrease in a ratio of a distribution gap of a corresponding second sub-histogram based on a result of comparing distribution gaps between corresponding sub-histograms of an original histogram with a corrected histogram. For example, the ratio adjustor 306 may detect a change in characteristic data based on a change (increase or decrease) in a ratio of distribution gaps of a corresponding first sub-histogram and a corresponding second sub-histogram in a corrected histogram with respect to a ratio of distribution gaps of a first sub-histogram and a second sub-histogram in an original histogram.

The ratio adjustor 306 may adjust a blending ratio such that characteristics of a corrected histogram maintain those of an original histogram based on a result of comparing characteristic data of the original histogram with that of the corrected histogram. The ratio adjustor 306 may generate a control signal such that, in the first blending ratio, a ratio of the first equalization algorithm is increased or decreased or a ratio of the second equalization algorithm is decreased or increased.

The ratio adjustor 306 may detect a degree of skewness or clip of a corresponding first sub-histogram and a corresponding second sub-histogram. Due to skewness or clip of a histogram, a shape of a corrected histogram may be different from that of an original histogram. The ratio adjustor 306 may adjust a stretching gain of a histogram based on a degree of skewness and clip of a corresponding first sub-histogram and a corresponding second sub-histogram. A stretching gain may be a limit value of a minimum index and a maximum index in a horizontal axis of a histogram during histogram equalization. An increase in a stretching gain may be a process of changing a minimum index and a maximum index such that a distribution gap is increased during histogram equalization. A decrease in a stretching gain may be a process of changing a minimum index and a maximum index such that a distribution gap is decreased during histogram equalization.

By adjusting a stretching gain such that shapes of a corresponding first sub-histogram and a corresponding second sub-histogram are maintained in those of a first sub-histogram and a second sub-histogram, excessive slices and/or clips of the corresponding first sub-histogram and the corresponding second sub-histogram may be minimized.

Figure 3A:
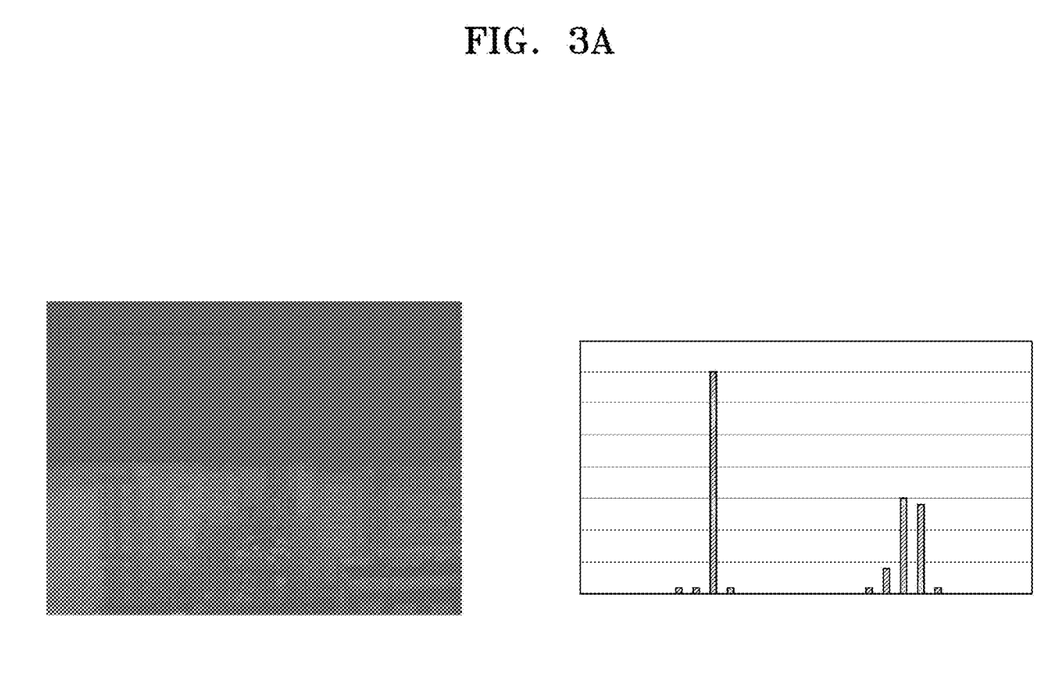
FIG. 3A is an example diagram illustrating an original thermal image and an original histogram of the original thermal image.

FIG. 3A is an example diagram illustrating an original thermal image and an original histogram of the original thermal image. Referring to FIG. 3A, a cold region like the sky makes up a relatively large portion of an image, and thus, an occurrence frequency of pixel brightness values is concentrated on a low-index region of a histogram.

Figure 3B:
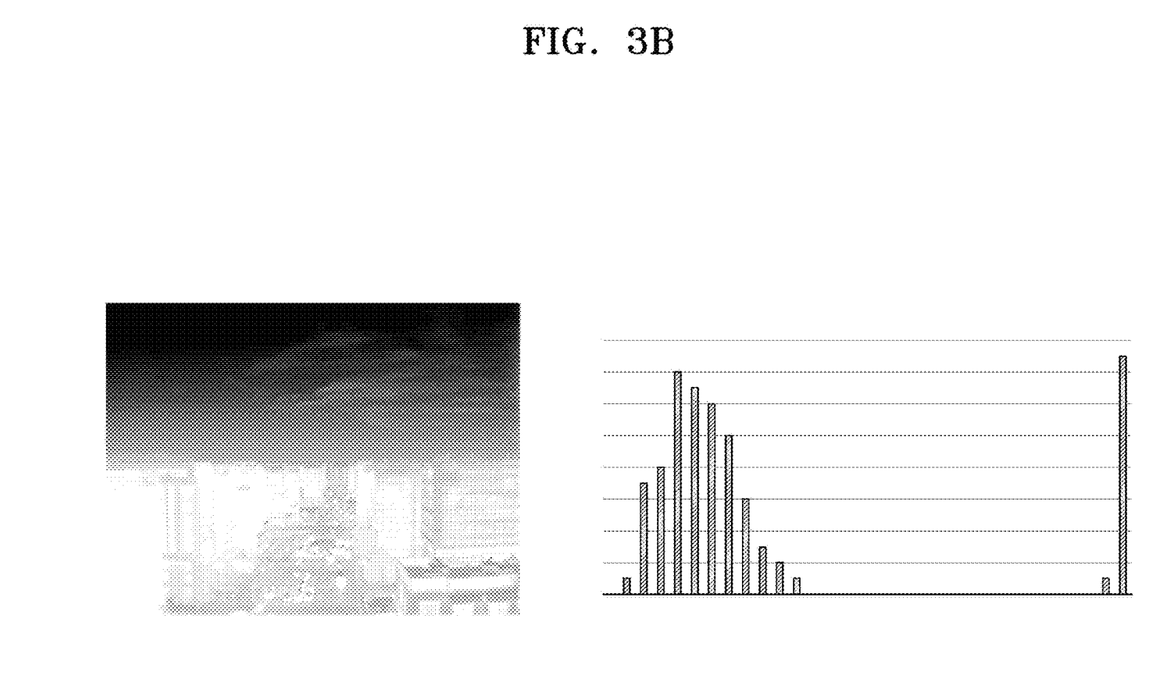
FIG. 3B is a diagram illustrating a corrected thermal image obtained by applying a first equalization algorithm to an original thermal image and a histogram of the corrected thermal image, according to an embodiment.

FIG. 3B is a diagram illustrating a corrected thermal image obtained by applying a first equalization algorithm to an original thermal image and a histogram of the corrected thermal image. Referring to FIG. 3B, histogram equalization is performed with respect to the sky region having a high occurrence frequency count (second region), and thus, regions other than the sky, that is, a building/road region (first region), are saturated and a contrast is weakened and detail elements of the building/road region (first region) may be lost.

Figure 3C:
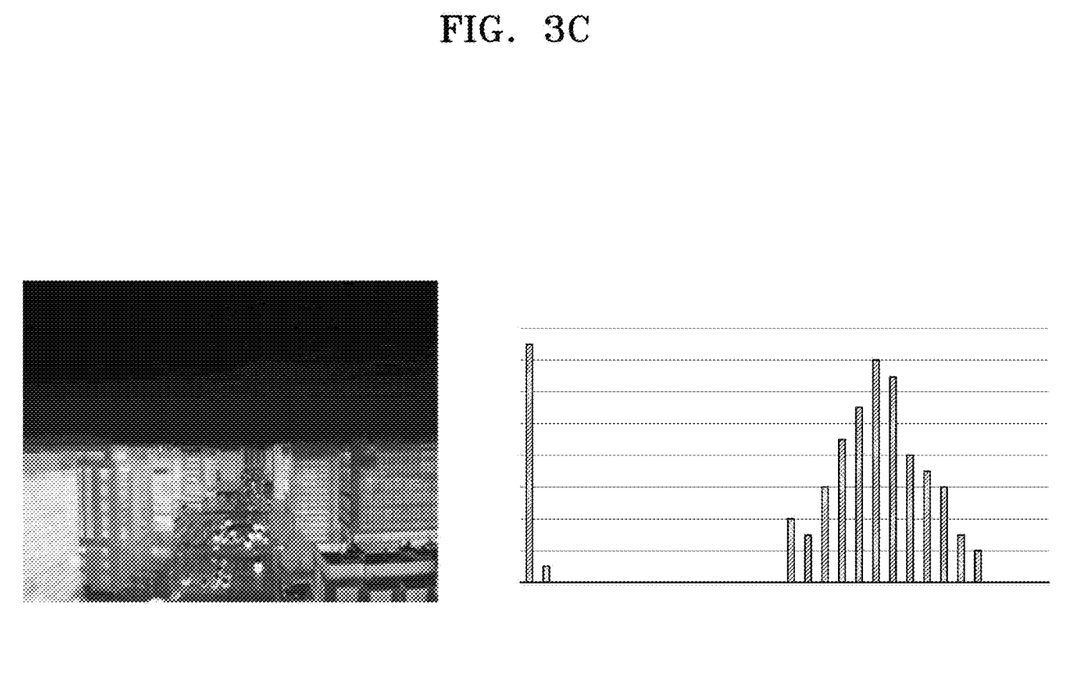
FIG. 3C is a diagram illustrating a corrected thermal image obtained by applying a second equalization algorithm to an original thermal image and a histogram of the corrected thermal image, according to an embodiment.

FIG. 3C is a diagram illustrating a corrected thermal image obtained by applying a second equalization algorithm to an original thermal image and a histogram of the corrected thermal image. Referring to FIG. 3C, as histogram equalization is performed with respect to the building/road region (first region), a contrast of the building/road region (first region) is expressed properly, but the sky region (second region) may be deteriorated and detail elements of the sky region may be lost.

Figure 4:
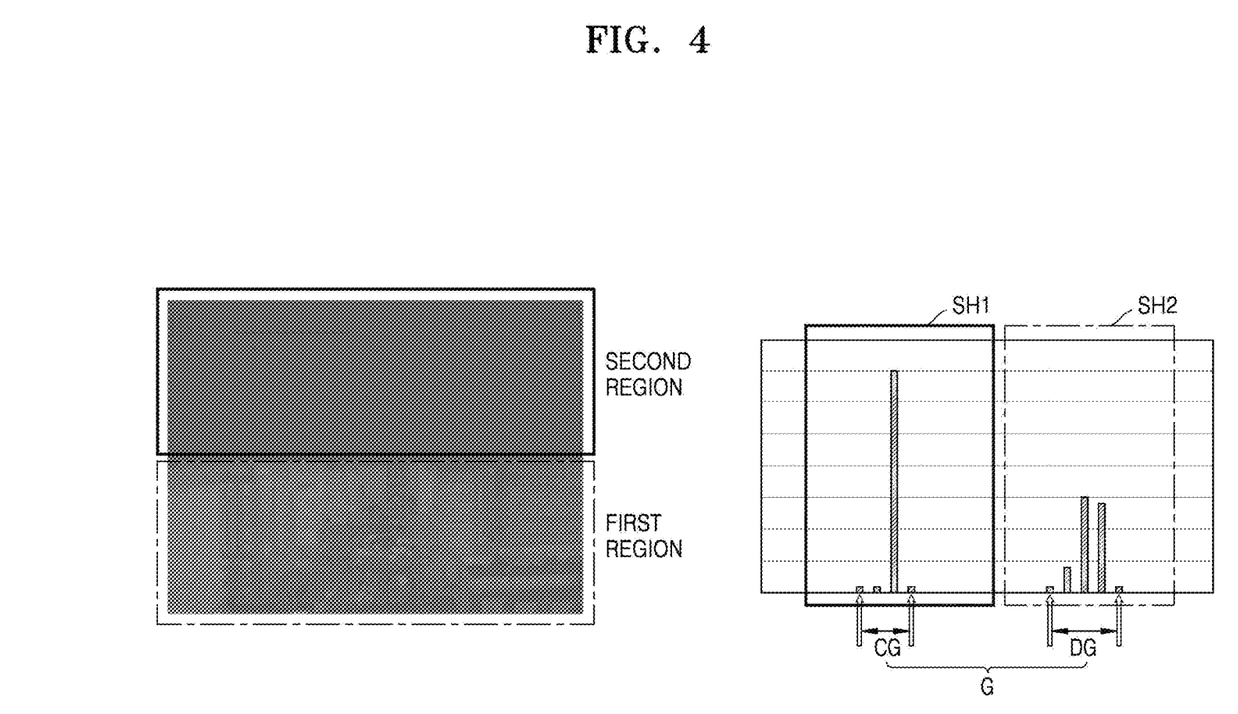
FIG. 4 is a diagram illustrating an example in which an original histogram is classified into sub-histograms, according to an embodiment.

FIG. 4 is a diagram illustrating an example in which an original histogram is classified into sub-histograms, according to an embodiment. FIG. 4 shows an example in which a second sub-histogram SH2 corresponding to a detailed region (first region) is distinguished from a first sub-histogram SH1 corresponding to other regions (second region) in an original thermal image. When a distribution gap G of a sub-histogram is less than a threshold, the sub-histogram is classified as the first sub-histogram SH1, and when the distribution gap G is equal to or greater than the threshold, the sub-histogram may be classified as the second sub-histogram SH2. In FIG. 4, the sky region (second region) is classified as the first sub-histogram SH1, and the building/road region (first region) is classified as the second sub-histogram SH2. A distribution gap CG of the first sub-histogram SH1 is smaller than a distribution gap DG of the second sub-histogram SH2.

Figure 5:
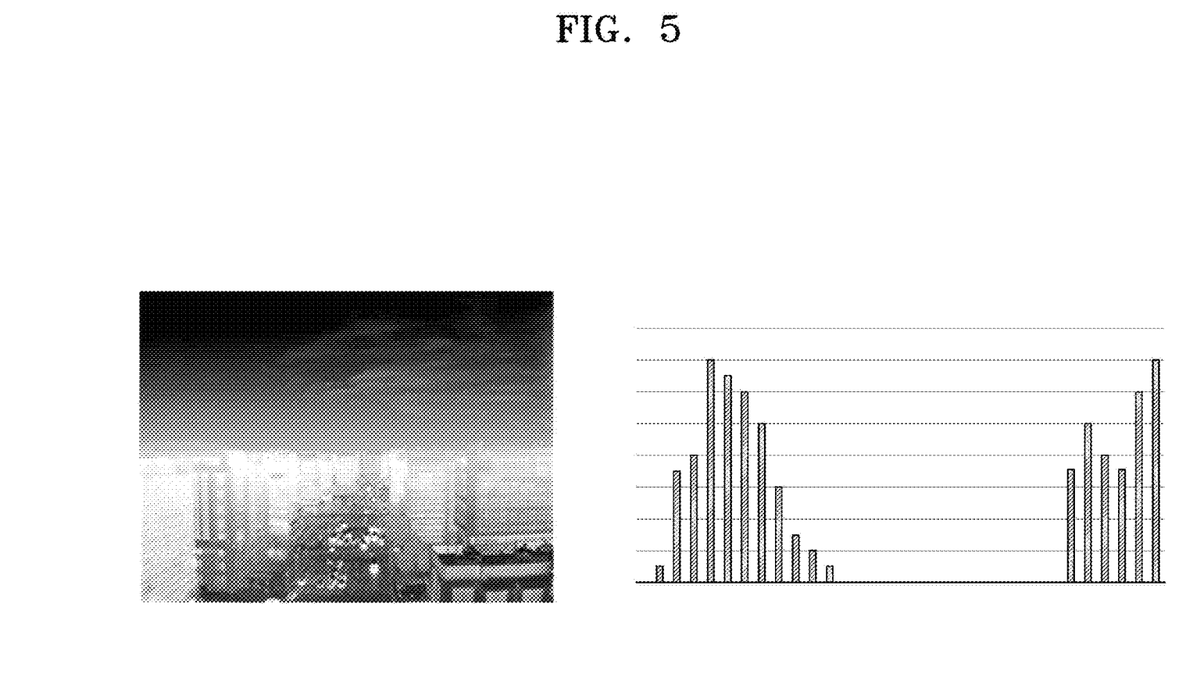
FIG. 5 is a diagram illustrating a first corrected thermal image and a corrected histogram of the first corrected thermal image, according to an embodiment.

FIG. 5 is a diagram illustrating a first corrected thermal image and a corrected histogram of the first corrected thermal image, according to an embodiment. Referring to FIG. 5, the first corrected thermal image generated by applying each of a first equalization algorithm and a second equalization algorithm to an original thermal image according to a blending ratio has an increased contrast in a first region and a second region, compared to the original thermal image of FIG. 3A.

Figure 6:
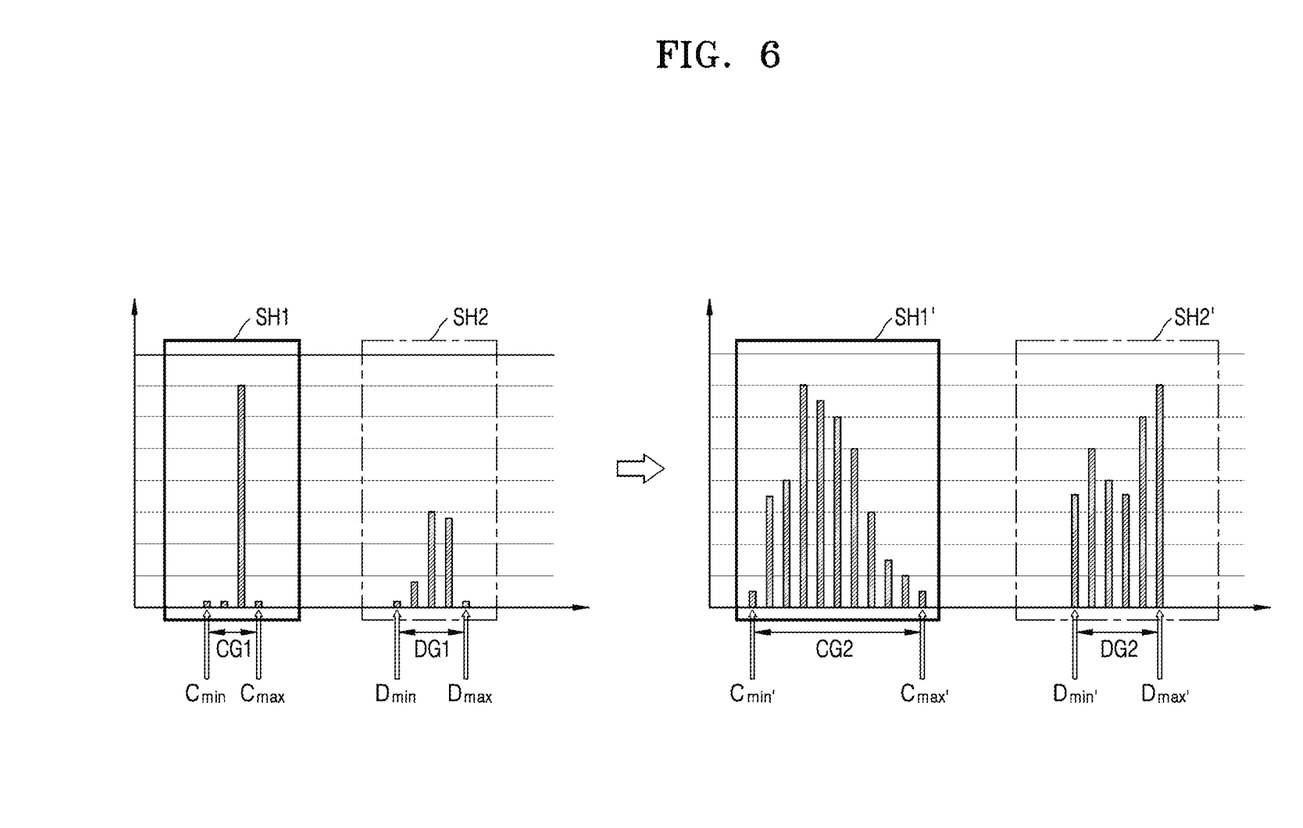
FIG. 6 is a diagram for describing a comparison of characteristic data of histograms for adjusting a blending ratio, according to an embodiment.

FIG. 6 is a diagram for describing a comparison of characteristic data of a histogram for adjusting a blending ratio, according to an embodiment.

From the left original histogram, a first distribution gap CG1, which is a difference between a minimum index Cmin and a maximum index Cmax of the horizontal axis of the first sub-histogram SH1, and a second distribution gap DG1, which is a difference between a minimum index Dmin and a maximum index Dmax of the horizontal axis of the second sub-histogram SH2, may be detected, respectively. Also, from the right corrected histogram, a third distribution gap CG2, which is a difference between a minimum index Cmin' and a maximum index Cmax' of the horizontal axis of a corresponding first sub-histogram SH1' and a fourth distribution gap DG2, which is a difference between a minimum index Dmin' and a maximum index Dmax' of the horizontal axis of a corresponding second sub-histogram SH2', may be detected, respectively.

Referring to FIG. 6, in the original histogram, the second distribution gap DG1 is larger than the first distribution gap CG1. On the other hand, compared to the original histogram, in the corrected histogram, as the third distribution gap CG2 is increased to be larger than the fourth distribution gap DG2, a ratio of the third distribution gap CG2 to the fourth distribution gap DG2 is a reverse of a ratio of the first distribution gap CG1 to the second distribution gap DG1. Also, as the corresponding second sub-histogram SH2' is skewed to the right to be clipped, the overall shape of the corresponding second sub-histogram SH2' is different from the overall shape of the second sub-histogram SH2. The ratio adjustor 306 may adjust a blending ratio such that the fourth distribution gap DG2 is increased compared to the third distribution gap CG2, and the ratio of the third distribution gap CG2 to the fourth distribution gap DG2 is maintained at the equal ratio to that between the first distribution gap CG1 and the second distribution gap DG1. For example, the ratio adjustor 306 may increase a ratio of a second equalization algorithm to a first equalization algorithm such that the fourth distribution gap DG2 is increased to be greater than the third distribution gap CG2.

Also, the ratio adjustor 306 may adjust a stretching gain by minimizing skewness of the corresponding second sub-histogram SH2', such that the overall shape of the corresponding second sub-histogram SH2' is maintained in the overall shape of the second sub-histogram SH2. For example, the ratio adjustor 306 may adjust the fourth distribution gap DG2 by changing the minimum index Dmin' and the maximum index Dmax' of the corresponding second sub-histogram SH2'.

The preprocessing unit 302 and the ratio adjustor 306 may adjust a blending ratio by repeatedly generating a first corrected thermal image and analyzing a corrected histogram until the corrected histogram has characteristics of an original histogram.

According to the embodiment of the present disclosure, by detecting an optimum blending ratio of the first equalization algorithm to the second equalization algorithm by analyzing histograms and equalizing a histogram of an original histogram, loss of detail elements in both the first region and the second region may be minimized.

Figure 7:
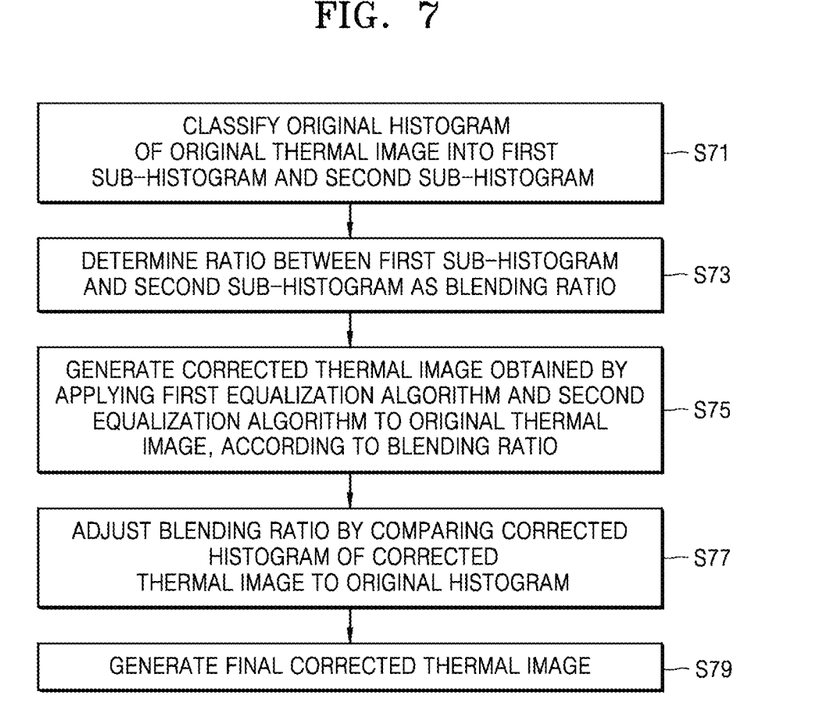
FIG. 7 is a schematic diagram illustrating a thermal image processing method according to an embodiment.

FIG. 7 is a schematic diagram illustrating a thermal image processing method according to an embodiment. The thermal image processing method of FIG. 7 may be performed using the processor 30 of the thermal camera 1 illustrated in FIG. 1. Hereinafter, detailed description of those details provided above with reference to FIGS. 1 through 6 will be omitted.

The processor 30 may analyze an original histogram with respect to an original thermal image and determine a blending ratio, which sets the amount of application a first equalization algorithm and a second equalization algorithm that are different from each other, based on a result of the analyzing. The first equalization algorithm may include a method of equalizing a histogram with respect to a region having a relatively high occurrence frequency in a histogram, and the second equalization algorithm may include a method of equalizing a histogram with respect to a region having a large number of detail elements.

The processor 30 may classify an original histogram into a second sub-histogram corresponding to a first region having a large number of detail elements and a first sub-histogram corresponding to a second region other than the first region (S71). The processor 30 may classify an original histogram into the first sub-histogram having a distribution gap that is less than a threshold and the original histogram into the second sub-histogram having a distribution gap equal to or greater than the threshold.

The processor 30 may determine a ratio of the first sub-histogram to the second sub-histogram as a blending ratio of the first equalization algorithm to the second equalization algorithm (S73).

The processor 30 may generate a first corrected thermal image obtained by applying the first equalization algorithm and the second equalization algorithm to the original thermal image, according to the blending ratio (S75).

The processor 30 may adjust the blending ratio by comparing the corrected histogram with respect to the first corrected thermal image with the original histogram. (S77). The processor 30 may detect a change between characteristic data of the original histogram and characteristic data of the corrected histogram. The processor 30 may detect a change between characteristic data of a sub-histogram of the original histogram and characteristic data of a corresponding sub-histogram of the original histogram. The processor 30 may adjust the blending ratio such that characteristics of the corrected histogram maintain those of the original histogram. The processor 30 may adjust the blending ratio by analyzing the first corrected thermal image that is repeatedly generated until the corrected histogram has the characteristics of the original histogram.

Also, the processor 30 may adjust a stretching gain by comparing the corrected histogram with the original histogram. The processor 30 may detect a level of skewness and clip of a histogram in the corrected histogram and adjust a stretching gain of the corrected histogram according to the skewness or clip. The processor 30 may adjust a stretching gain of a histogram by minimizing the skewness and clip of the corrected histogram such that the shape of the corrected histogram maintains the shape of the original histogram.

The processor 30 may generate, as a final corrected thermal image, a second corrected thermal image obtained by applying the first equalization algorithm and the second equalization algorithm to the original thermal image, according to a finally adjusted blending ratio and a finally adjusted stretching gain (S79).

Figure 8:
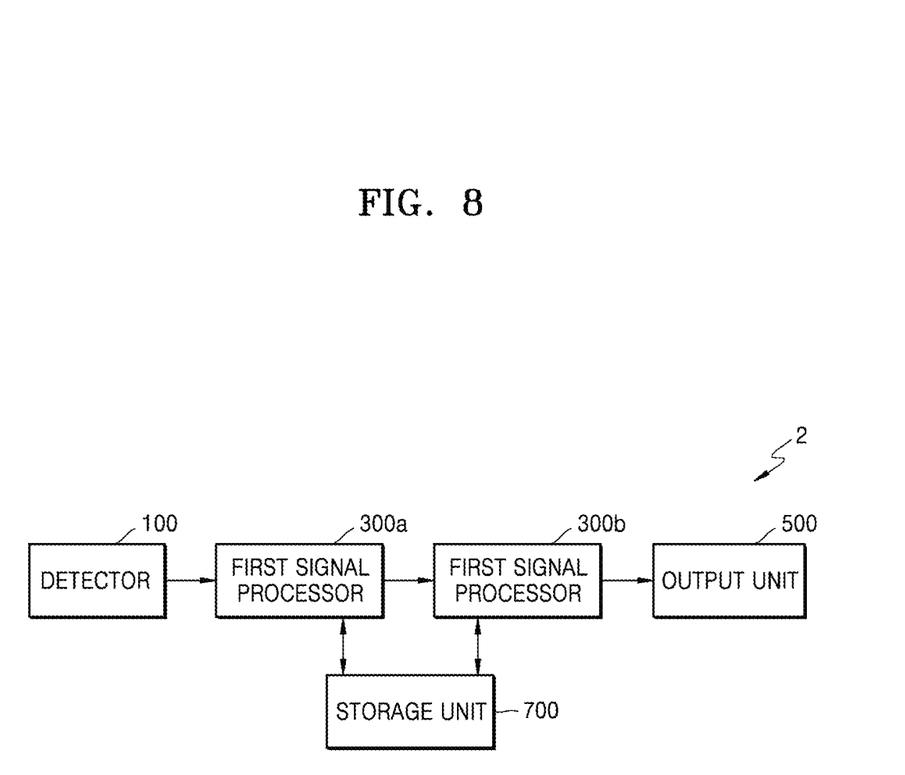
FIG. 8 is a schematic diagram illustrating a thermal camera according to an embodiment.

FIG. 8 is a schematic diagram illustrating a thermal camera according to an embodiment.

Referring to FIG. 8, a thermal camera 2 may include a detector 100, a first signal processor 300a, a second signal processor 300b, an output unit 500, and a storage unit 700. Like the thermal camera 1 illustrated in FIG. 1, the thermal camera 2 illustrated in FIG. 8 may also perform histogram equalization on a thermal image.

The detector 100 may correspond to the input unit 10 of FIG. 1.

The first signal processor 300a may generate a thermal image by using a pixel brightness value input from the detector 100. The first signal processor 300a may generate a corrected thermal image having improved contrast by adjusting a distribution of pixel brightness values of an original thermal image by performing histogram equalization and/or histogram stretching on original thermal image data.

The second signal processor 300b may analyze a histogram, and determine ratios of applying a plurality of histogram equalization algorithms to generate a corrected thermal image. The second signal processor 300b may perform additional image processing on the corrected thermal image, on which histogram equalization is performed.

As described above with reference to FIG. 1, histogram equalization may be performed using a single processor, or as illustrated in FIG. 8, the first signal processor 300a and the second signal processor 300b may be implemented as separate processors and histogram equalization may be performed using these signal processors. According to an embodiment, the first signal processor 300a may be implemented using a field programmable gate array (FPGA), and the second signal processor 300b may be implemented using an image signal processor (ISP).

A thermal image on which signal processing is performed via the first signal processor 300a and the second signal processor 300b may be provided to a user via the output unit 500.

The storage unit 700 may store parameters required for signal processing of the first signal processor 300a and the second signal processor 300b, an original thermal image, and a corrected thermal image.

The method of processing a thermal image by using a thermal camera according to the embodiments of the present disclosure can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, code, and code segments for accomplishing the present disclosure can be easily construed by programmers skilled in the art to which the present disclosure pertains.

According to the embodiments of the present disclosure, a thermal camera having an optimally improved contrast by minimizing loss of detail elements by using histogram equalization methods for processing thermal image data and adjusting a ratio of applying the histogram equalization methods according to an installation environment of the thermal camera.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A thermal image processing method comprising:
   determining a blending ratio of a first equalization algorithm to a second equalization algorithm that are different from each other, based on a result of analyzing an original histogram of an original thermal image;
   generating a first corrected thermal image obtained by applying the first equalization algorithm and the second equalization algorithm to the original thermal image according to the blending ratio;
   adjusting the blending ratio by comparing a corrected histogram of the first corrected thermal image with the original histogram; and
   generating a second corrected thermal image obtained by applying the first equalization algorithm and the second equalization algorithm to the original thermal image according to the adjusted blending ratio.

2. The thermal image processing method of claim 1, wherein the determining of the blending ratio comprises:
   classifying the original histogram into a second sub-histogram corresponding to a first region having a large number of detail elements in the original thermal image and a first sub-histogram corresponding to a second region other than the first region; and
   determining a ratio of the first sub-histogram to the second sub-histogram as a blending ratio of the first equalization algorithm to the second equalization algorithm.

3. The thermal image processing method of claim 2, wherein the classifying of the original histogram comprises:
   calculating a distribution gap which is a difference between a minimum index and a maximum index on a horizontal axis of a sub-histogram;
   classifying the sub-histogram into the first sub-histogram when the distribution is less than a threshold; and
   classifying the sub-histogram into the second sub-histogram when the distribution gap is equal to or greater than the threshold.

4. The thermal image processing method of claim 2, wherein the ratio of the first sub-histogram to the second sub-histogram is a ratio of a sum of occurrence frequencies of the first sub-histogram to a sum of occurrence frequencies of the second sub-histogram.

5. The thermal image processing method of claim 2, wherein the adjusting of the blending ratio comprises:
   detecting second characteristic data from the corrected histogram by using a corresponding first sub-histogram corresponding to the first sub-histogram and by using a corresponding second sub-histogram corresponding to the second sub-histogram; and
   adjusting the blending ratio by comparing the second characteristic data with first characteristic data of the first sub-histogram and the second sub-histogram.

6. The thermal image processing method of claim 5, wherein the comparison of the first characteristic data with the second characteristic data comprises comparing a distribution gap of the first sub-histogram with a distribution gap of the corresponding first sub-histogram and comparing a distribution gap of the second sub-histogram with a distribution gap of the corresponding second sub-histogram.

7. The thermal image processing method of claim 5, further comprising:
   detecting skewness and clip of the corresponding first sub-histogram and the corresponding second sub-histogram from the corrected histogram; and
   adjusting a gain of the corresponding first sub-histogram and the corresponding second sub-histogram according to the skewness and clip.

8. The thermal image processing method of claim 1, wherein the first equalization algorithm equalizes the histogram with respect to a region having a high occurrence frequency in the histogram, and the second equalization algorithm equalizes the histogram with respect to a region having a large number of detail elements.

9. A thermal camera comprising:
   a detector; and
   a processor configured to generate a thermal image by using a pixel brightness value input from the detector,
   wherein the processor is further configured to determine a blending ratio of a first equalization algorithm to a second equalization algorithm that are different from each other, based on a result of analyzing an original histogram of an original thermal image, and generate a first corrected thermal image obtained by applying the first equalization algorithm and the second equalization algorithm to the original thermal image according to the blending ratio,
   wherein the processor is further configured to adjust the blending ratio by comparing a corrected histogram of the first corrected thermal image with the original histogram, and generate a second corrected thermal image obtained by applying the first equalization algorithm and the second equalization algorithm to the original thermal image according to the adjusted blending ratio,
   wherein the processor is further configured to classify the original histogram into a second sub-histogram corresponding to a first region having a large number of detail elements and a first sub-histogram corresponding to a second region other than the first region, and determine a ratio of the first sub-histogram to the second sub-histogram as a blending ratio of the first equalization algorithm to the second equalization algorithm,
   wherein the first equalization algorithm equalizes the histogram with respect to a region having a high occurrence frequency in the histogram, and wherein the second equalization algorithm equalizes the histogram with respect to a region having a large number of detail elements,
   wherein the processor is further configured to calculate second characteristic data from the corrected histogram by using a corresponding first sub-histogram corresponding to the first sub-histogram and by using a corresponding second sub-histogram corresponding to the second sub-histogram and adjust the blending ratio by comparing the second characteristic data with first characteristic data of the first sub-histogram and the second sub-histogram, and
   wherein the comparison of the first characteristic data with the second characteristic data comprises comparing a distribution gap of the first sub-histogram with a distribution gap of the corresponding first sub-histogram and comparing a distribution gap of the second sub-histogram with a distribution gap of the corresponding second sub-histogram.

10. A thermal camera comprising:
    a detector; and a processor configured to generate a thermal image by using a pixel brightness value input from the detector, wherein the processor is further configured to determine a blending ratio of a first equalization algorithm to a second equalization algorithm that are different from each other, based on a result of analyzing an original histogram of an original thermal image, and generate a first corrected thermal image obtained by applying the first equalization algorithm and the second equalization algorithm to the original thermal image according to the blending ratio, and adjust the blending ratio by comparing a corrected histogram of the first corrected thermal image with the original histogram, and generate a second corrected thermal image obtained by applying the first equalization algorithm and the second equalization algorithm to the original thermal image according to the adjusted blending ratio.

11. The thermal camera of claim 10, wherein the processor is further configured to classify the original histogram into a second sub-histogram corresponding to a first region having a large number of detail elements and a first sub-histogram corresponding to a second region other than the first region, and determine a ratio of the first sub-histogram to the second sub-histogram as a blending ratio of the first equalization algorithm to the second equalization algorithm.

12. The thermal camera of claim 11, wherein the processor is further configured to:
calculate a distribution gap which is a difference between a minimum index and a maximum index on a horizontal axis of a sub-histogram;
classify the sub-histogram into the first sub-histogram when the distribution gap is less than a threshold; and
classify the sub-histogram into the second sub-histogram when a distribution gap is equal to or greater than the threshold.

13. The thermal camera of claim 11, wherein the ratio of the first sub-histogram to the second sub-histogram is a ratio of a sum of occurrence frequencies of the first sub-histogram to a sum of occurrence frequencies of the second sub-histogram.

14. The thermal camera of claim 11, wherein the processor is further configured to detect second characteristic data from the corrected histogram by using a corresponding first sub-histogram corresponding to the first sub-histogram and by using a corresponding second sub-histogram corresponding to the second sub-histogram and adjust the blending ratio by comparing the second characteristic data with first characteristic data of the first sub-histogram and the second sub-histogram.

15. The thermal camera of claim 14, wherein the comparison of the first characteristic data with the second characteristic data comprises comparing a distribution gap of the first sub-histogram with a distribution gap of the corresponding first sub-histogram and comparing a distribution gap of the second sub-histogram with a distribution gap of the corresponding second sub-histogram.

16. The thermal camera of claim 14, wherein the processor is further configured to detect, from the corrected histogram, skewness and clip of the corresponding first sub-histogram and the corresponding second sub-histogram, and adjust a gain of the corresponding first sub-histogram and the corresponding second sub-histogram according to the skewness and clip.

17. The thermal camera of claim 10, wherein the first equalization algorithm equalizes the histogram with respect to a region having a high occurrence frequency in the histogram, and wherein the second equalization algorithm equalizes the histogram with respect to a region having a large number of detail elements.

* * * * *